UNITED STATES PATENT OFFICE.

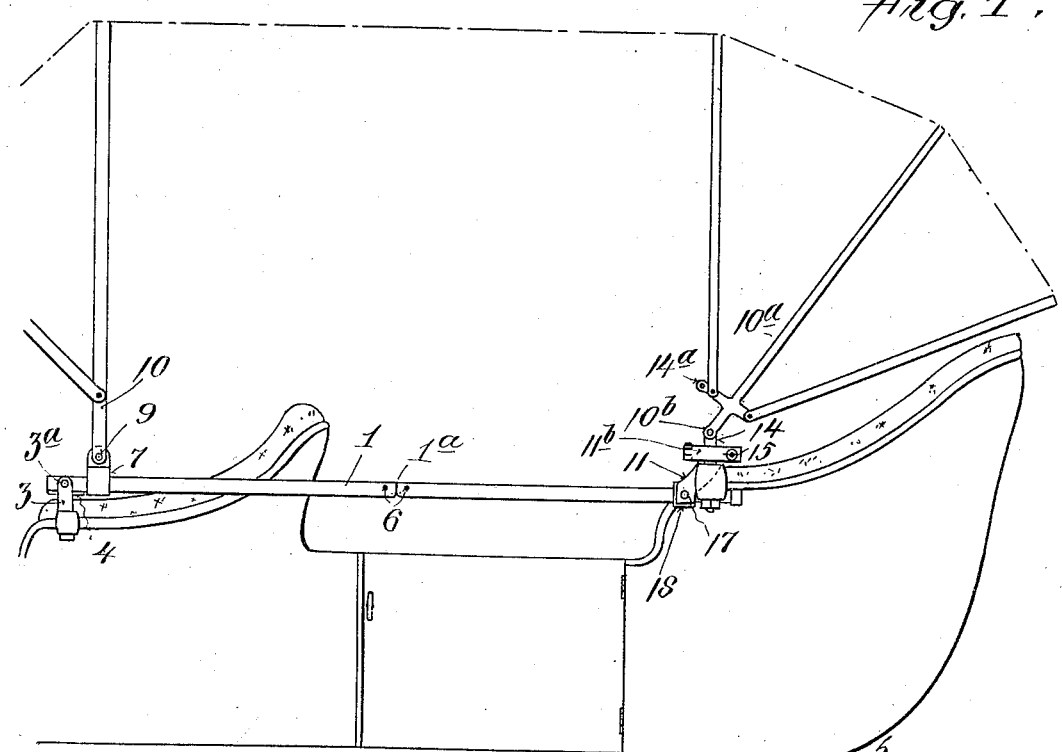

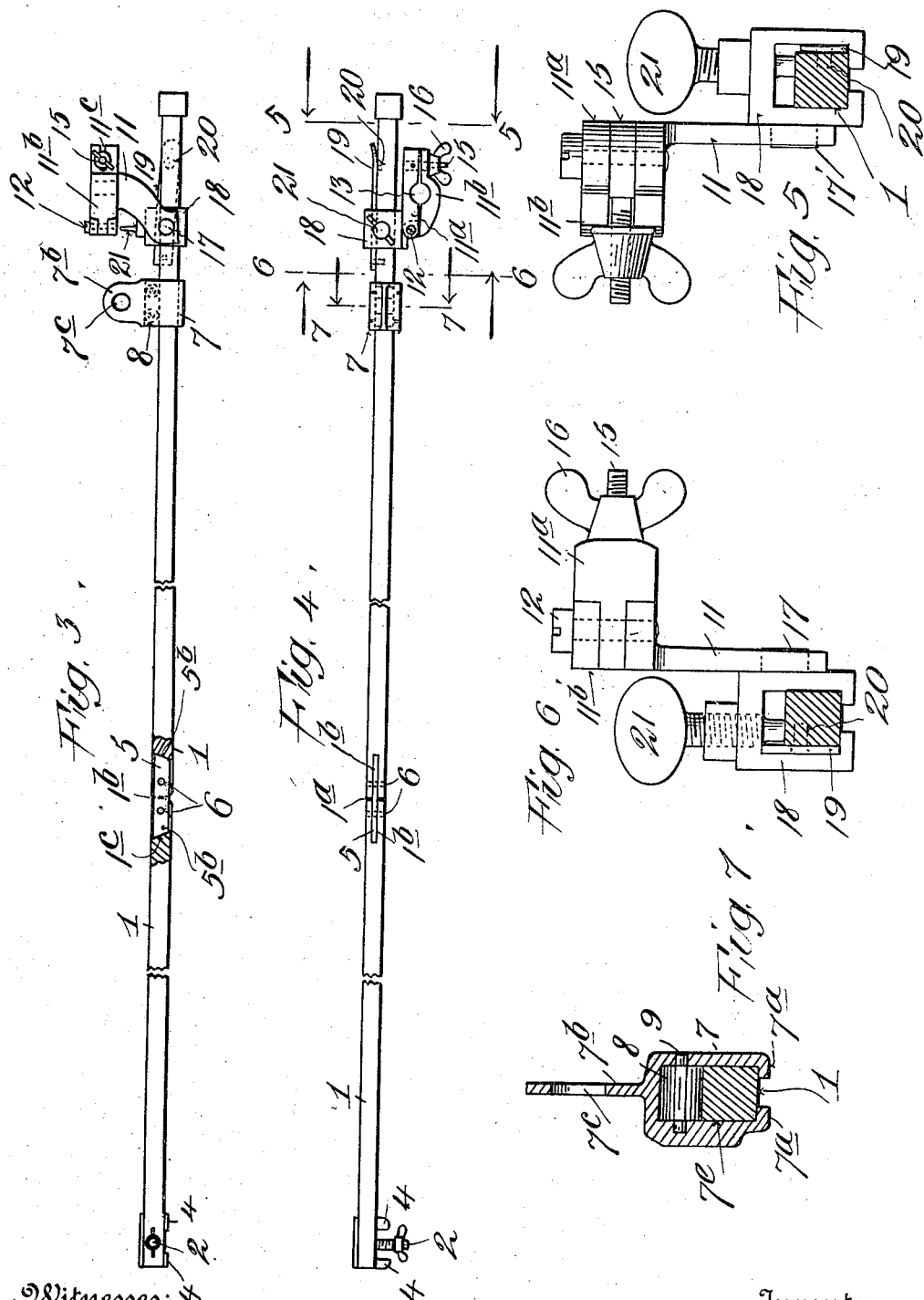

GEORGE W. CHRISTOPHER, OF ELIZABETH, NEW JERSEY, AND WILLIAM CHAS. L. EVANS, OF NEW YORK, N. Y.

VEHICLE-TOP RAISER.

1,034,423.  Specification of Letters Patent.  Patented Aug. 6, 1912.

Application filed December 20, 1911. Serial No. 666,879.

*To all whom it may concern:*

Be it known that we, GEORGE W. CHRISTOPHER and WILLIAM CHARLES L. EVANS, citizens of the United States, and residents of Elizabeth, Union county, New Jersey, and New York city, borough of Manhattan, county and State of New York, respectively, have invented certain new and useful Improvements in Vehicle-Top Raisers, of which the following is a specification.

The object of our invention is to provide improved means to aid in raising and lowering tops of vehicles and has particular adaptability to aid in raising and lowering the tops of automobiles.

Our invention comprises novel details of improvement and combinations of parts that will be more fully hereinafter set forth and then pointed out in the claims.

Reference is to be had to the accompanying drawings forming part hereof, wherein, Figure 1 is a side view of a portion of an automobile illustrating our improvements in position for raising or lowering the top; Fig. 2 is a side view showing portions of the top and our improvements lowered or folded; Fig. 3 is a partly broken side view of our improvements; Fig. 4 is a plan view thereof; Fig. 5 is a section on the line 5, 5, in Fig. 4; Fig. 6 is a section on the line 6, 6, in Fig. 4, and Fig. 7 is a section on the line 7, 7, in Fig. 4.

Similar numerals of reference indicate corresponding parts in the several views.

The bar 1 is shown provided at one end with a screw 2 adapted to enter an eye in a bracket 3 carried at the forward part of the vehicle; said bar being shown provided with a guide or fork 4 adjacent screw 2 to receive bracket 3 to aid in adjusting the bar to the bracket and in maintaining the parts in position. While bar 1 may be in a single piece we have shown the same comprising two members jointed at $1^a$ to enable the bar to be folded for convenient storage or placing when not in use. To this end we have shown the adjacent ends of the bar slotted or recessed at $1^b$ and receiving the hinge member 5 attached to the members of the bar by pivots 6, whereby the hinge member 5 is concealed within the bar when the latter is straightened out for use, and when the bar is folded (Fig. 2) its members may lie one above the other in parallel relation, at which time the hinge member 5 will extend transversely of said bar, as shown in Fig. 2. In order to retain the two members of the bar in alinement when extended, as in Fig. 3, the ends of the member 5 are shown inclined at $5^b$ to engage the correspondingly inclined surfaces $1^c$ at the ends of the recesses $1^b$. The arrangement described provides a smooth surface for the bar at its joint to permit free travel along the bar of the carrier 7 mounted to slide thereon.

Carrier 7 is shown formed with an inner space $7^e$ receiving bar 1 and containing rollers 8 shown carried by pivots 9, said rollers resting upon bar 1 to permit free travel of carrier 7 thereon. The lower portions $7^a$ of carrier 7 are shown bent inwardly to retain the carrier upon bar 1. Carrier 7 has an upwardly projecting lug $7^b$ provided with an opening $7^c$ to receive the stud 9 of the bow 10 of the vehicle top. Bar 1 is carried by a bracket 11 having clamping members $11^a$, $11^b$, hinged together at one end by the screw or stud 12 and provided with the opening 13 to receive the bracket 14 carried at the rear portion of the vehicle. Screw 15, shown hinged upon the member $11^a$ and entering slot $11^c$ of member $11^b$, serves with the nut 16 to detachably secure bracket 11 to bracket 14. Bracket 11 is pivoted at 17 to slide or block 18 mounted upon bar 1. Slide 18 is shown provided with a spring arm 19 having a pin 20 to enter spaced holes in the side of bar 1 to hold slide 18 in adjusted position upon said bar. A screw 21 carried by slide 18 and adapted to bear against bar 1 serves to hold slide 18 firmly in set position.

In accordance with our improvements the brackets 11, which will preferably be made right and left handed with respect to the vehicle, are secured in proper position respectively upon the rear brackets 14 at opposite sides of the vehicle, and when the top is lowered (Fig. 2) the studs 9 of the front bow 10, will be placed, as usual, in eyes $14^a$, of the rear bows $10^a$ of the top which are pivoted, as at $10^b$, upon brackets 14, and bar 1 will be folded and swung back adjacent the bows of the top, since the slides 18 will turn on pivots 17 connected with brackets 11. When the top is to be raised the bars 1 on opposite sides of the vehicle will be swung forwardly into the position shown in Fig. 1, slides 18 turning on pivots 17 and the respective screws 2 will be entered in the eyes 3ª of brackets 3, the guides 4 aiding in such adjustment. The studs 9 of the front bows are then removed from the eyes 14ª and placed in the corresponding carriers 7, which are placed adjacent the brackets 11, and the front bows are thus supported upon bars 1 and while so supported may be drawn forwardly, substantially to the position shown in Fig. 1, and then the screws 2 will be removed from eyes 3ª and the front ends of bars 1 rested upon brackets 3, and then the studs 9 of bows 10 will be released from carriers 7 and inserted in the eyes 3ª of the front brackets 3. The bars 1 may then be folded back in the normal position of non-use shown in Fig. 2. When the top is to be lowered the operations above described are reversed, that is to say, the bars 1 will be rested upon brackets 3, studs 9 of the front bows will be then connected with the carriers 7 that have been placed on the bars adjacent the brackets 3, the screws 2 of the bars may then be connected with brackets 3, the front bows then slid rearwardly and their studs 9 connected with eyes 14ª, the top lowered, and the side bars replaced in normal positions.

By the means described a person may conveniently raise and lower the vehicle top without assistance.

While one bar 1 may be used on one side of the vehicle it will be easier to raise and lower the vehicle top by using one bar 1 on each side thereof.

Having now described our invention what we claim is:

1. The combination of a bar having means at one end to connect with a vehicle, a bracket adjacent the opposite end of the bar, said bracket having means for detachably and firmly connecting it with a bracket on a vehicle, said bar having an adjustable member pivotally connected with the first named bracket, and a carrier mounted upon the bar and provided with means for connection with a bow of a vehicle top.

2. The combination of a bar provided with means at one end to connect with a vehicle, a slide movably mounted upon the opposite end of said bar, means for adjustably connecting said slide with said bar, a bracket pivotally connected with said slide, said bracket having clamping means for rigidly and detachably connecting it with a bracket of a vehicle, a carrier mounted upon said bar and provided with means for connection with the bow of a vehicle top, said slide being provided with a screw to firmly connect it with said bar to hold the bar in set position in the slide.

3. The combination of a bar provided with means at one end to connect with a bracket of a vehicle, a slide mounted movably upon the opposite end of said bar, said slide being provided with a spring having a projection to enter holes in the bar to hold the slide and bar in relative positions of adjustment, a bracket pivotally connected with said slide, said bracket having means for detachably holding it rigidly upon a bracket of a vehicle, and a carrier mounted upon said bar and provided with means for connection with the bow of a vehicle top.

4. The combination of a bar provided with means at one end for connection with a bracket of a vehicle, a slide carried by said bar adjacent its opposite end, a bracket pivotally connected with said slide, said bracket having a movable jaw and a screw for holding the bracket upon a bracket of a vehicle, and a carrier mounted upon the bar and provided with an eye to receive a projection from the bow of a vehicle top.

Signed at New York city, N. Y. December 18, 1911.

GEORGE W. CHRISTOPHER.
WILLIAM CHAS. L. EVANS.

Witnesses:
 MAX M. KOTZEN,
 T. F. BOURNE.

---

Copies of this patent may be obtained for five cents each, by addressing the "Commissioner of Patents, Washington, D. C."